US012663118B1

(12) United States Patent
Fogen et al.

(10) Patent No.: US 12,663,118 B1
(45) Date of Patent: Jun. 23, 2026

(54) PRESSURE REGULATOR FOR GAS CYLINDER WITH A LOW-PRESSURE SENSOR AND RESTRICTION FOR DETERMINING A GAS FLOW AND REMAINING USAGE TIME

(71) Applicant: ROTAREX S.A., Roost (LU)

(72) Inventors: René Fogen, Sankt Vith (BE); Philippe Schmitz, Steinsel (LU); Stephan Sellen, Wehingen (DE)

(73) Assignee: ROTAREX S.A., Roost Bissen (LU)

(*) Notice: Subject to any disclaimer, the term of this patent is extended or adjusted under 35 U.S.C. 154(b) by 54 days.

(21) Appl. No.: 18/881,595

(22) PCT Filed: Jul. 6, 2023

(86) PCT No.: PCT/EP2023/068725
§ 371 (c)(1),
(2) Date: Jan. 6, 2025

(87) PCT Pub. No.: WO2024/008872
PCT Pub. Date: Jan. 11, 2024

(30) Foreign Application Priority Data

Jul. 6, 2022 (LU) ....................................... 502467

(51) Int. Cl.
*F17C 13/02* (2006.01)

(52) U.S. Cl.
CPC .... *F17C 13/025* (2013.01); *F17C 2205/0338* (2013.01); *F17C 2205/035* (2013.01);
(Continued)

(58) Field of Classification Search
CPC .............................. F17C 13/02; F17C 13/025; F17C 2205/0338; F17C 2205/035;
(Continued)

(56) References Cited

U.S. PATENT DOCUMENTS 7,089,956 B1 * 8/2006 Davidson ................ F17C 13/04 137/382
7,237,570 B2 * 7/2007 Gamard ............... G05D 7/0133 137/614.19
(Continued)

FOREIGN PATENT DOCUMENTS

EP 3756715 A1 12/2020
FR 2868160 A1 9/2005
(Continued)

OTHER PUBLICATIONS

International Search Report to corresponding PCT/EP2023/068725 mailed on Sep. 11, 2023.
(Continued)

*Primary Examiner* — Nicolas A Arnett
(74) *Attorney, Agent, or Firm* — Sandberg Phoenix & von Gontard, P.C.

(57) ABSTRACT

A pressure regulator for a gas cylinder, comprising a gas inlet, a gas outlet and a gas passage fluidly connecting the gas inlet with the gas outlet; a pressure reducer located in the gas passage, downstream of the gas inlet; a flow selector located in the gas passage, downstream of the pressure reducer; a pressure sensor located in the gas passage between the flow selector and the gas outlet; and a flow restriction located in the gas passage and downstream of the pressure sensor.

20 Claims, 4 Drawing Sheets

(52) U.S. Cl.
CPC . *F17C 2205/0382* (2013.01); *F17C 2221/011* (2013.01); *F17C 2250/043* (2013.01); *F17C 2270/025* (2013.01)

(58) Field of Classification Search
CPC ........ F17C 2205/0382; F17C 2221/011; F17C 2250/043; F17C 2270/025
See application file for complete search history.

(56) References Cited

U.S. PATENT DOCUMENTS

| | | | | |
|---|---|---|---|---|
| 8,869,822 | B2 * | 10/2014 | Boyer | F16K 17/02 267/141 |
| 9,273,799 | B2 * | 3/2016 | Fowler | F17C 13/002 |
| 9,816,642 | B2 * | 11/2017 | Fowler | F17C 13/004 |
| 11,268,656 | B2 * | 3/2022 | Lolia | F17C 13/025 |
| 12,487,614 | B2 * | 12/2025 | Boyer | G05D 16/024 |
| 2005/0076956 | A1 * | 4/2005 | Frederiksen | G01L 19/08 137/557 |
| 2015/0247605 | A1 * | 9/2015 | Despres | F17C 13/04 222/402.1 |
| 2021/0382506 | A1 * | 12/2021 | Sellen | F17C 13/04 |
| 2022/0299169 | A1 * | 9/2022 | Mary | G01F 13/006 |
| 2022/0333742 | A1 * | 10/2022 | Muller | F17C 13/04 |

FOREIGN PATENT DOCUMENTS

| | | | |
|---|---|---|---|
| WO | 2012164240 | A2 | 12/2012 |
| WO | 20150132285 | A1 | 9/2015 |
| WO | 20200074325 | A1 | 4/2020 |

OTHER PUBLICATIONS

Written Opinion to corresponding PCT/EP2023/068725 mailed on Sep. 11, 2023.

* cited by examiner

[Fig. 1]
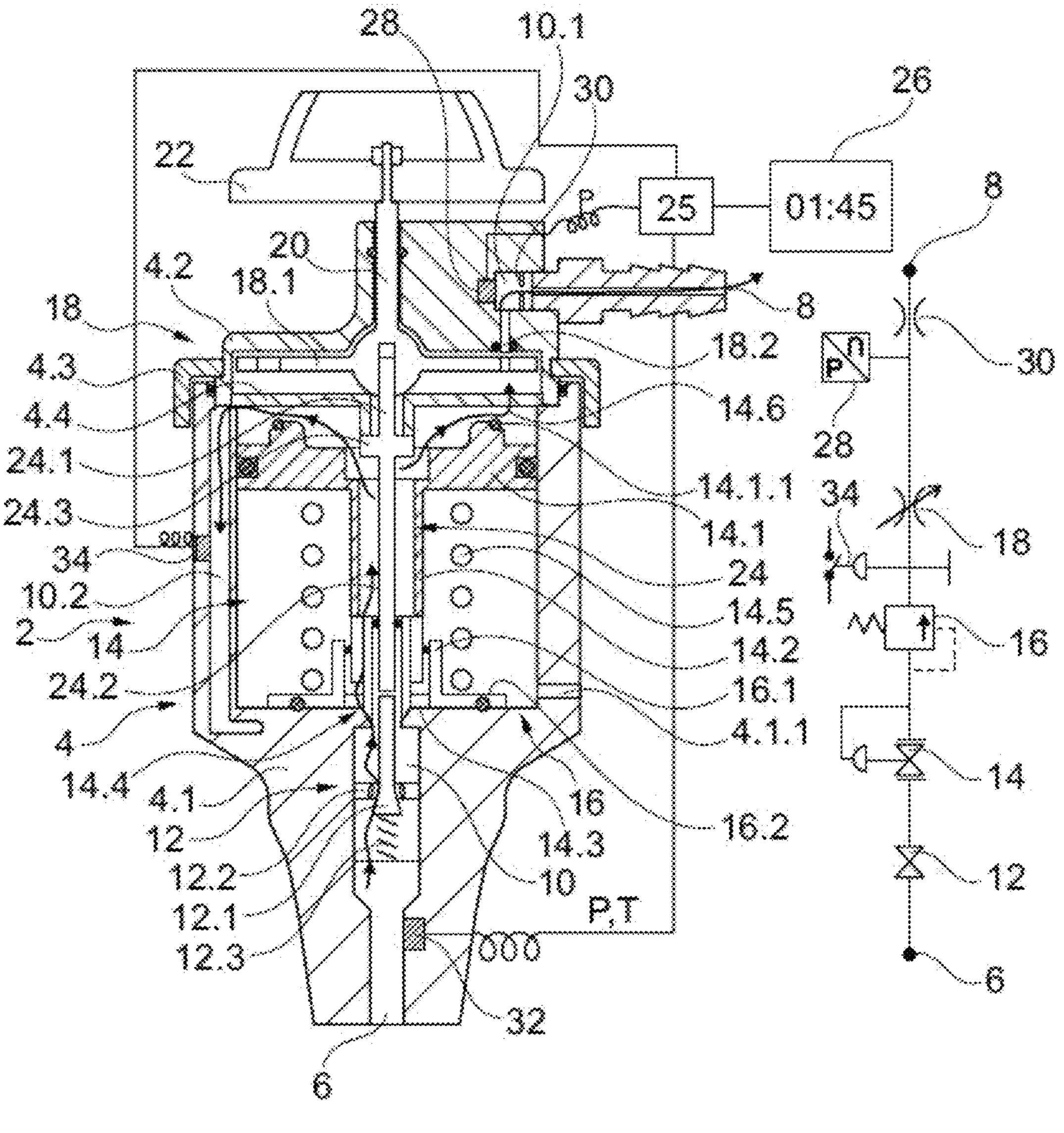

[Fig. 2]
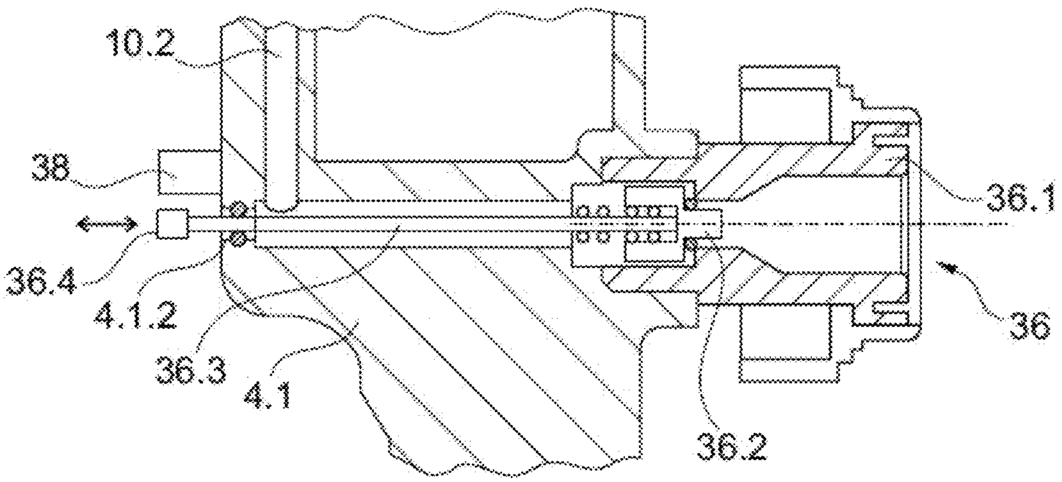
[Fig. 3]
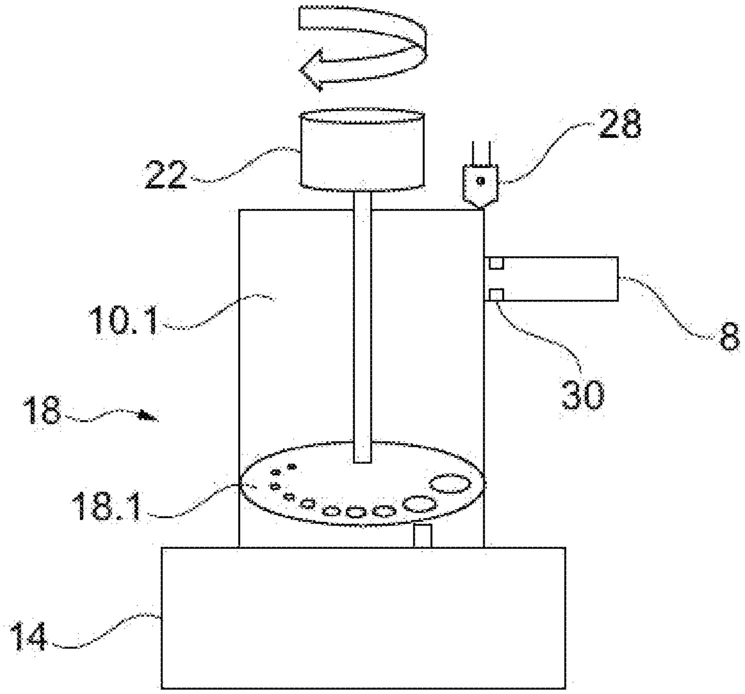

[Fig. 4]
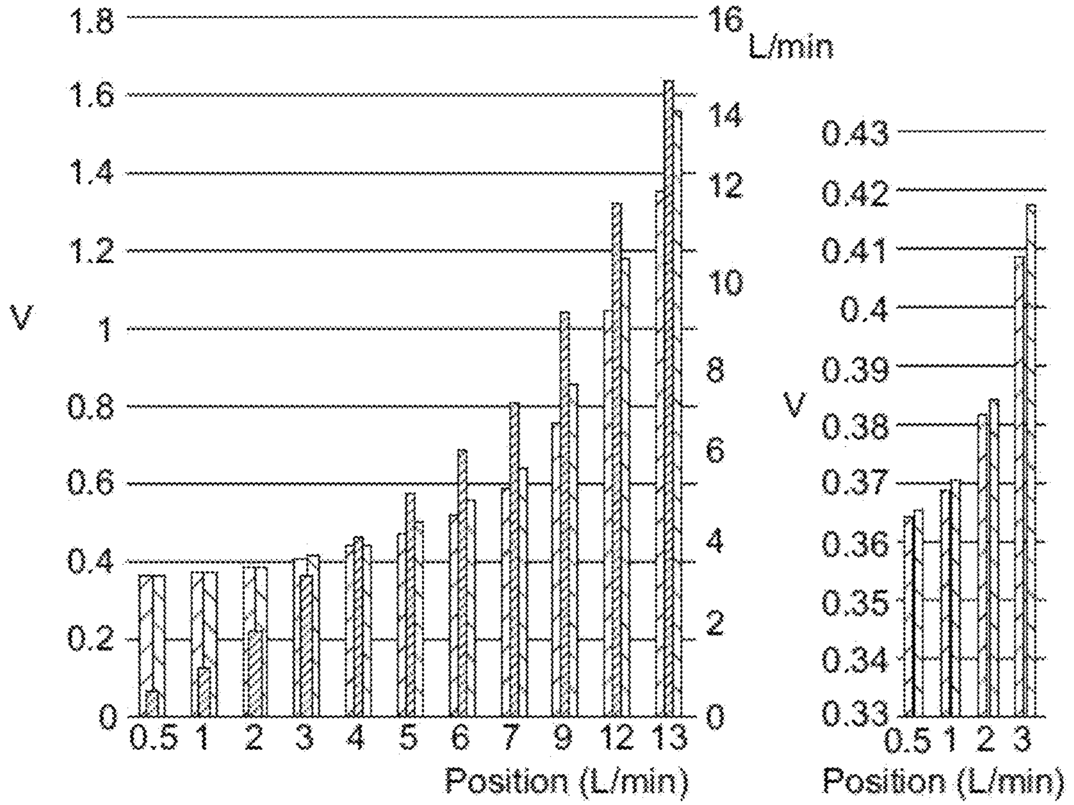

[Fig. 5]
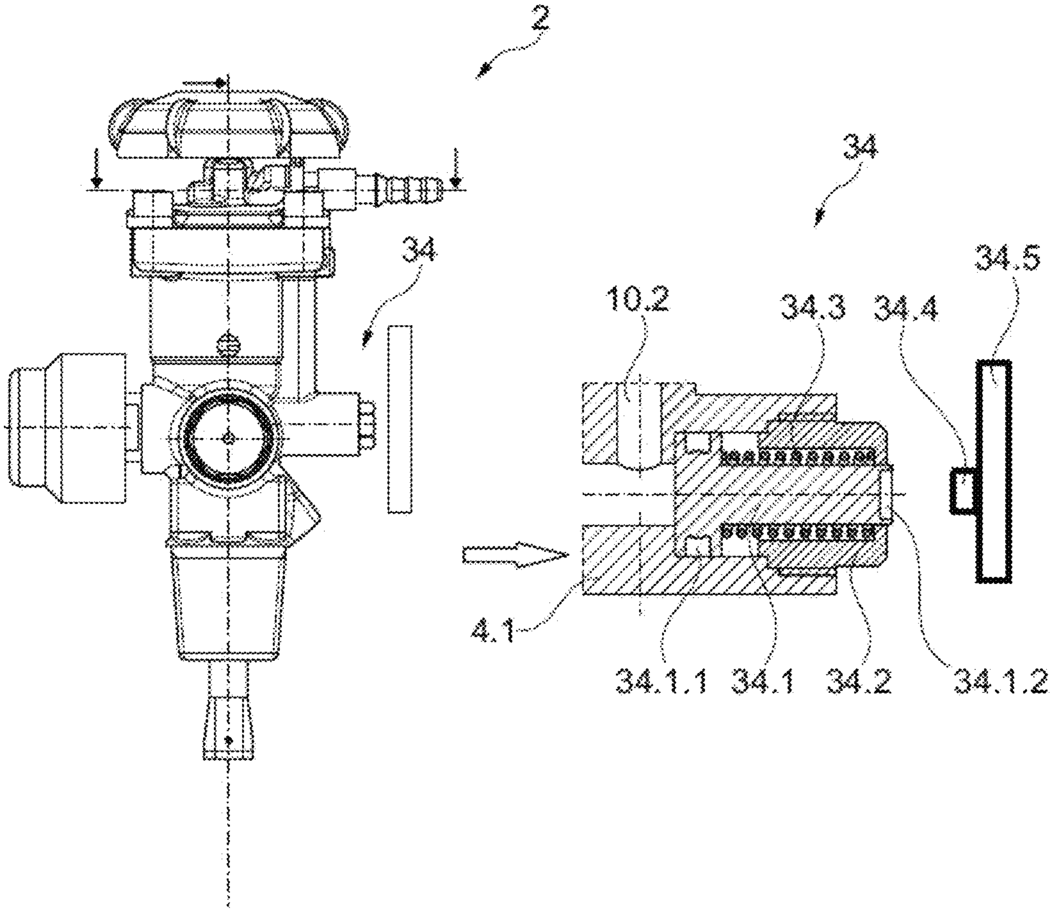

PRESSURE REGULATOR FOR GAS CYLINDER WITH A LOW-PRESSURE SENSOR AND RESTRICTION FOR DETERMINING A GAS FLOW AND REMAINING USAGE TIME

CROSS-REFERENCE TO RELATED APPLICATIONS

The present invention is the US national stage under 35 U.S.C. § 371 of International Application No. PCT/EP2023/068725 which was filed on Jul. 6, 2023, and which claims the priority of application LU502467 filed on Jul. 6, 2022, the contents of which (text, drawings and claims) are incorporated here by reference in their entirety.

FIELD

The invention is directed to the field of pressure regulators for gas cylinder, e.g. containing gas, like oxygen, at high pressure of at least 100 bar.

BACKGROUND

Prior art patent document published WO 01/69340 A1 discloses a monitoring system for a gas cylinder, comprising essentially a pressure sensor provided between a shut-off valve of the gas cylinder and a pressure reducer downstream of said shut-off valve, a temperature sensor of the gas in the cylinder and a control unit connected to the sensors. The control unit is designed for providing different indications relating the system, including the level of gas in the cylinder.

Prior art patent document published FR 2 868 160 A1 discloses also a monitoring system for a gas cylinder, comprising essentially a pressure sensor for the gas in the cylinder and a control unit connected to the sensor and configured for displaying a remaining usage time of the gas cylinder, based on a variation of the gas pressure in the cylinder while gas is outputted. Gas needs however to be outputted during a long time before causing a detectable and interpretable pressure variation in the gas cylinder, meaning that the reactivity of such a monitoring system is low.

Prior art patent document published WO 2012/164240 A1 discloses a pressure regulator for gas cylinder, comprising a flow selector and sensors detecting discrete positions of the flow selector for determining the gas flow, a sensor of the gas pressure in the cylinder, so as to determine the remaining usage time of the gas cylinder. The detection of the position of the flow selector alleviates the deficiency of the preceding reference, i.e. a low reactivity. However, it renders the pressure regulator sophisticated and thereby expensive and subject to failures.

Prior art patent document published EP 3 756 715 A1 discloses also a monitoring system for a gas cylinder equipped with a pressure reducer and a flow selector, comprising a sensor of the position of the flow selector and a sensor of the gas pressure in the cylinder, so as to determine a remaining usage time of the gas cylinder. The monitoring system further comprises a pressure sensor in a derivation conduit fluidly connected between the flow selector and an outlet, so as to detect a disconnection or an obstruction of a gas consumer device. Similarly to the above reference, this monitoring system renders the pressure regulator sophisticated and thereby expensive and subject to failures.

SUMMARY

The invention has for technical problem to overcome at least one of the drawbacks of the above cited prior art. More specifically, the invention has for technical problem to provide a pressure regulator for a gas cylinder that determines in a reliable and reactive manner the remaining usage time of the gas cylinder while being of simple construction.

The invention is directed to a pressure regulator for a gas cylinder, comprising: a gas inlet, a gas outlet and a gas passage fluidly connecting the gas inlet with the gas outlet; a pressure reducer located in the gas passage, downstream of the gas inlet; a flow selector located in the gas passage, downstream of the pressure reducer; a pressure sensor located in the gas passage between the flow selector and the outlet; characterized in that the pressure regulator further comprises: a flow restriction located in the gas passage and downstream of the pressure sensor.

The flow restriction is inside the pressure regulator, upstream of the gas outlet.

According to an exemplary embodiment, the flow selector comprises a cross-section that is selectable between a minimum cross-section and a maximum cross-section, the flow restriction having a cross-section comprised between the minimum cross-section and the maximum cross-section, in various instances between the minimum cross-section and 90% of the maximum cross-section, for example between 60% and 90% of the maximum cross-section, for example between 70% and 90% of the maximum cross-section. Advantageously, the maximum cross-section is dimensioned such as to, when selected to be flown by the gas flow, generate a pressure directly downstream of said maximum cross-section that is comprised between 50% and 95%, in various instances between 70% and 90%, of the dynamic nominal pressure of the pressure regulator. Advantageously, the minimum cross-section is dimensioned such as to, when selected to be flown by the gas flow, generate a pressure directly downstream of said minimum cross-section that is comprised between 5% and 50%, in various instances between 5% and 30%, of the dynamic pressure of the pressure regulator. The dynamic pressure of the pressure regulator is the regulated pressure directly at the outlet of the pressure regulator when being flown by a flow of gas.

According to an exemplary embodiment, the flow restriction comprises a calibrated hole mounted upstream of the outlet.

According to an exemplary embodiment, the gas passage between the flow selector and the flow restriction forms a volume of at least 1 $mm^3$.

According to an exemplary embodiment, the flow selector is configured to provide a selectable flow comprised between 0.1 and 25 litres/min.

According to an exemplary embodiment, the flow selector provides a selectable flow in a step-wise manner only.

According to an exemplary embodiment, the pressure regulator further comprises a control unit to which the pressure sensor is connected and configured to determine a gas flow rate from a signal of the pressure sensor.

According to an exemplary embodiment, the control unit is configured to determine the gas flow rate from the signal of the pressure sensor in the absence of a signal of detection of a position of the flow regulator.

According to an exemplary embodiment, the control unit is configured to determine the gas flow rate from the signal of the pressure sensor in the absence of a signal of measurement of the gas flow.

According to an exemplary embodiment, the pressure regulator further comprises a pressure switch located in the flow passage between the pressure reducer and the flow selector, and electrically connected to the control unit, said control unit being configured to switch from a sleep-mode to a wake-up mode when the gas in contact with the pressure switch reaches a threshold pressure in various instances comprised between 0.5 and 5 bar, for example comprised between 0.5 and 3 bar. The threshold pressure can be comprised between 0.5 bar and 80% of the dynamic pressure of the pressure regulator.

Advantageously, the pressure switch comprises a plunger movable mounted on a body of the pressure regulator and urged in a first position by a spring and movable to a second position when the gas in contact with the plunger reaches the threshold pressure, and a switch or sensor outside of the body and configured to cooperate with the plunger so as to detect when said plunger is in the second position. Advantageously, the first position is a retracted position and the second position is an extended position. Advantageously, the switch or sensor magnetically cooperates with a distal end of the plunger. Advantageously, the switch or sensor is mounted on a printed circuit board attached to the body.

According to an exemplary embodiment, the pressure regulator further comprises a high-pressure sensor located in the gas passage upstream of the pressure reducer, and electrically connected to the control unit.

According to an exemplary embodiment, the control unit is configured to determine a remaining usage time of the gas cylinder based on the determined gas flow and a signal of the high-pressure sensor.

According to an exemplary embodiment, the pressure regulator further comprises a branch of the gas passage directly connecting between the pressure reducer and the flow selector and connecting to an auxiliary connector.

According to an exemplary embodiment, the auxiliary connector comprises a shutter that is normally closed by a spring and the pressure regulator further comprises a position sensor of said shutter.

According to an exemplary embodiment, the auxiliary connector further comprises a position pin with that is attached to the shutter and extends away from said shutter to the position sensor for interacting with said position sensor.

According to an exemplary embodiment, the pressure switch is located in the branch of the gas passage.

According to an exemplary embodiment, the pressure sensor is configured to measure pressures ranging from 0 to 10 bar.

According to an exemplary embodiment, the pressure regulator is void of a detector of a position of the flow regulator and void of a gas flow sensor.

The invention is also directed to a method of determining a gas flow rate at a gas outlet of a pressure regulator on a gas cylinder, wherein the pressure regulator comprises a pressure reducer and a flow selector downstream of the pressure reducer, the method comprises: measuring a gas pressure in the gas flow downstream of the flow selector and upstream of a flow restriction; and determining the gas flow rate based on the measured gas pressure in the gas flow downstream of the flow selector and upstream of a flow restriction.

Advantageously, the flow restriction is inside the pressure regulator, upstream of a gas outlet of said pressure regulator.

The measured gas pressure in the gas flow downstream of the flow selector and upstream of a flow restriction corresponds to an electric signal representative of said gas pressure.

Advantageously, the above determination of the gas flow rate is without detecting a position of the flow selector.

According to an exemplary embodiment, the method further comprises: measuring a pressure of the gas in the gas cylinder; and determining a remaining usage time based on the measured pressure of the gas in the gas cylinder and the determined gas flow rate.

According to an exemplary embodiment, the method further comprises: determining that the gas outlet is obstructed when the measured gas pressure in the gas flow downstream of the flow selector and upstream of a flow restriction reaches or exceeds a predetermined level. The predetermined level is advantageously greater than a maximum gas pressure in the gas flow downstream of the flow selector and upstream of a flow restriction, when the flow selector is set at a maximum cross-section without any obstructions in normal use, and equal to or less than a nominal outlet pressure of the pressure reducer. The maximum cross-section of the flow selector is selected so that the maximum gas pressure in the gas flow downstream of the flow selector and upstream of a flow restriction, when the flow selector is set at a maximum cross-section, and in the absence of obstruction, is less than the nominal dynamic outlet pressure of the pressure reducer, in various instances comprised between 70% and 90% of the nominal dynamic outlet pressure of the pressure reducer.

Advantageously, the pressure regulator of the method is according to the invention.

The invention is particularly interesting in that it provides an efficient and reliable solution means for determining a gas flow rate in that it does not require the use of a flow rate sensor and a detection of the position of the flow selector, both of which being potentially sophisticated, expensive and/or subject to failure.

Existing flow detection technologies based on the measurement of the position of the flow selector axis or handwheel are not able to detect if there is really a flow respectively a change in the flow value as they only measure a position. In the worst case, the pressure regulator does not work or might be obstructed meaning the patient does not receive oxygen, but the position sensor indirectly detects a theoretical flow value. The invention is particularly interesting in that it only provides a flow value if there really is a flow supplying the patient with oxygen, Gas flowmeters can be based on an accurate measure of a pressure difference which very often does not sustain an outlet pressure of a few bars that can occur when the gas outlet is obstructed. They can also be based on thermal transfer, like using a hot wire, thereby consuming a higher amount of electrical power and increased inertia for the detection of flow changes.

DRAWINGS

FIG. 1 comprises a longitudinal sectional view of a pressure regulator for a gas cylinder, according to the invention, and a layout of the architecture of the pressure regulator.

FIG. 2 is a section view of a portion of the pressure regulator of FIG. 1, showing the gas passage to a medical port.

FIG. 3 is a schematic illustration of the upper part of the pressure regulator of FIG. 1, illustrating the functioning principle of the pressure measurement for determining the gas flow position and the gas flow.

FIG. 4 is a graphic illustration of the signal of the pressure sensor at a low and a high pressure in the gas cylinder, for each position of the flow selector, thereby illustrating the correlation between the signal of the pressure sensor and the gas flow.

FIG. 5 is an embodiment of the pressure switch schematically represented in FIG. 1.

DETAILED DESCRIPTION

FIG. 1 comprises a longitudinal sectional view of a pressure regulator for a gas cylinder, according to the invention, and a layout of the architecture of the pressure regulator.

The pressure regulator 2 comprises a body 4 with a gas inlet 6, a gas outlet 8 and a gas passage fluidly interconnecting the gas inlet and gas outlet. The gas inlet 6, the gas outlet 8 and the gas passage are formed the body 4. The body 4 comprises for instance a main part 4.1, a top part 4.2 and a ring nut 4.3 securing the top part 4.2 on the main part 4.1. The gas inlet 6 is formed on a lower end of the main part 4.1 of the body 4 that forms a male thread designed for engaging with a female thread on a neck of a gas cylinder, as this is customary. The outlet 8 is on the top part 4.2 of the body 4, for instance formed by a fitting with hose barb, being however understood that other fittings can be considered.

The pressure regulator 2 comprises a shut-off valve 12 located in the gas passage 10, downstream of the gas inlet 6. The shut-off valve 12 comprises essentially a shutter 12.1, a seat 12.2 and a spring 12.3 urging the shutter 12.1 against the seat 12.2 so as to normally close the gas passage 10. The shutter 12.1 comprises a poppet located on an upstream side of the seat 12.2 and a stem rigid with the poppet and extending from the poppet through the seat 12.2. The seat 12.2 is fixed with the body 4.

The pressure regulator 2 further comprises a pressure reducer 14, also located in the gas passage 10, downstream of the shut-off valve 12. The pressure reducer comprises a movable element 14.1, being for instance shaped as a piston, in a cavity, for instance a bore, formed in the gas passage 10 in the body 4, for instance in the main part 4.1 of the body 4. The movable element comprises a shaft 14.2 extending from the movable element 14.1 and provided at its distal end with a shutter 14.3 that cooperates with a seat 14.4. A spring 14.5 urges the movable element 14.1 and incidentally the shutter 14.3 away from the seat 14.4 so as to open the gas passage between the shutter 14.3 and the seat 14.4. The distal end of the shaft 14.2 is received in a sliding and gas-tight fashion in a bushing 16.1 of a pressure relief element 16. The latter comprises an annular plate 16.2 resting on a bottom of the cavity housing the pressure reducer 14 and urged on the bottom by the spring 14.5 of the pressure reducer 14. Sealing means are provided in the contact between the bottom of the cavity and the annular plate 16.2 of the pressure relief element 16. When the gas undergoing a pressure reduction by flowing between the shutter 14.3 and seat 14.4 of the pressure reducer 14 reaches a pressure exceeding a predetermined threshold, the resulting force on the pressure relief element 16, for instance on the portion of the annular plate 16.2 delimited by the sealing means, will move the pressure relief element 16 slightly away from the bottom of the cavity against the force of the spring 14.5 and will flow to the ambient through the leak passage 4.1.1 in the body 4, for instance the main part 14.1 thereof.

The distal end of the shaft 14.2 of the pressure reducer 14 is provided with longitudinal passages allowing the gas to flow longitudinally towards an upper face of the movable element 14.1 in a regulating chamber 14.6 delimited by the movable element 14.1, the cavity and an intermediate plate 4.4 of the body 4. The pressure of gas in the regulating chamber 14.6 exerts on the movable element 14.1 a force that is opposed to the resilient force of the spring 14.5 and progressively moves the movable element 14.1, acting as a pressure sensing element, towards the seat 14.4 resulting in a progressive closing of the gas passage and thereby a pressure reduction and regulation of the pressure reduction. The above functioning principle is a such well known from the skilled person.

The upper face of the movable element 14.1 is configured to contact in a gas-tight fashion, by virtue of sealing means 14.1.1, the opposite face of the intermediate plate 4.4 of the body 4, so as to close the gas passage when the pressure at the gas inlet 6 reaches a lower limit, e.g. a few bar, i.e. when the gas cylinder is becoming empty, thereby forming a residual pressure device. The sealing means 14.1.1 are for instance an annular gasket housed in a cavity formed on the upper face of the movable element 14.1, being however understood that it could be constructed differently, e.g. provided on the opposite face of the intermediate plate 4.4 of the body 4.

The pressure regulator 2 further comprises a flow selector 18, also located in the gas passage 10, downstream of the pressure reducer 14. The flow selector 18 comprises essentially a disk 18.1 provided with calibrated holes, and a fixed passage 18.2 provided with sealing means against which the disk 18.1 can rotate so as to selectively position one of its calibrated holes in front of the fixed passage 18.2 so as to allow the gas at the reduced pressure to flow through a calibrated cross-section in the gas passage. The fixed passage 18.2 is formed on the body 4, for instance on the top part 14.2 thereof. The disk 18.1 is rigidly fixed with a spindle 20 supported by the top part 4.2 of the body and to which a hand-wheel 22 is fastened for rotational operation thereof.

The pressure regulator 2 further comprises an actuating pin 24 for actuating the shut-off valve 12. The actuating pin comprises an upper portion 24.1 rotatably engaging with the spindle 20, a lower portion 24.2 extending through the shaft 14.2 of the pressure reducer 14 until a distal end of the stem of the shutter 12.1 of the shut-off valve 12, and an intermediate portion 24.3 with a cam surface cooperating with a corresponding surface on the intermediate plate 4.4 of the body 4.

Operation of the pressure regulator 2 is the following. Rotation of the hand-wheel 22 causes rotation of the actuating pin 24 causing, by virtue of the cam surface 24.3, a translational downward movement of the actuating pin 24 and thereby opening of the shut-off valve 12. The gas flows through the pressure reducer 14 and the flow selector 18 to the gas outlet 8. Further rotation of the hand-wheel causes a further rotation of the disk 18.1 that allows selection of a flow rate by positioning one of the several calibrated holes in front of the fixed passage 18.2. The cam surface 24.3 of the actuating pin 24 is configured to generate the translational movement that over a fraction of a complete turn of the spindle and hand-wheel, e.g. not more than 50°, so as to leave the remainder of the complete turn for selecting the flow rate.

The above construction of the pressure regulator 2 is further detailed in the application WO 2020/074325 A1 and the corresponding patent application published US2021382506 A1 which is incorporated by reference in its entirety.

As this is visible in FIG. 1, the pressure regulator 2 comprises a control unit 25 that is connected to a display 26 for indicating among others a remaining usage time of the gas cylinder onto which the pressure regulator 2 is mounted and based on the gas flow that is selected on the pressure regulator 2. To that end, the pressure regulator 2 further comprises a pressure sensor 28 located in the gas passage between the flow selector 18 and the outlet 8, as well as a flow restriction 30 provided also in the gas passage between the pressure sensor 28 and the outlet 8. The pressure sensor 28 is electrically connected to the control unit 25 so as to provide a signal representative of the gas pressure, the control unit being configured for determining the gas flow rate based on that signal and for determining a remining usage time of the gas cylinder. To that end, the pressure regulator 2 further comprises a high-pressure sensor 32 that is located in the gas passage 10 at the gas inlet 6, for sensing the pressure of the gas in the gas cylinder. The high-pressure sensor 32 is also electrically connected to the control unit 25. It can comprise or be associated with a temperature sensor.

The presence of the flow restriction 30 causes, in the presence of a gas flow, an increase of the pressure upstream thereof, i.e. in the section of the gas passage where the pressure sensor 28 is located, which is representative of the gas flow rate. The cross-section S of the gas passage of the flow restriction 30 can dependent on several parameters, predominantly on the flow rate. For a flow selector with a cross-section of the flow passage ranging from a minimal value x $mm^2$ to a maximal value y $mm^2$, the cross-section of the gas passage of the flow restriction 30 is advantageously comprised between the minimum cross-section and the maximum cross-section, i.e. $x \leq S \leq y$, in various instances, $x < S < 0.9 \cdot y$.

The outlet pressure of the pressure reducer 14 can be comprised between 3.5 and 10 bar, so that the pressure sensor 28 is advantageously configured for measuring pressures comprised between 0 and 10 bar. The pressure sensor 28 can have a working pressure ranging from 0 to 5 bar, in various instances from 0 to 4 bar, while showing an overpressure (where the sensor still outputs a signal representative, but less accurate, of the effective pressure) of at least 16 bar and/or of not more than 20 bar, and/or a burst pressure of at least 25 bar.

The maximum cross-section of the flow selector can be dimensioned such as to, when selected to be flown by the gas flow, generate a limited pressure loss resulting in a pressure directly downstream of the maximum cross-section that is comprised between 50% and 95%, in various instances between 70% and 90%, of the dynamic pressure of the pressure reducer 14. Also, the minimum cross-section of the flow selector can be dimensioned such as to, when selected to be flown by the gas flow, generate a substantial pressure loss, resulting in pressure directly downstream of the minimum cross-section that is comprised between 5% and 50%, in various instances between 5% and 30%, of the dynamic pressure of the pressure regulator 14. The dynamic pressure of the pressure regulator 14 is the regulated pressure directly at the outlet of the pressure regulator when being flown by a flow of gas.

The pressure sensor 28 is in various instances positioned at some distance of the flow restriction 30 in order to sense exclusively the total pressure, i.e. to avoid sensing a pressure where the gas is in movement to such an extent that its static pressure is reduced compared with its total pressure. That distance can be of at least a few millimetres. The pressure sensor 28 is for instance located in a cavity 10.2 of the gas passage 10, where the cavity shows a volume of at least 1 $mm^3$, in various instances at least 20 $mm^3$, for example at least 50 $mm^3$. Such a cavity is useful for stabilizing the gas pressure while the gas is flow through the cavity towards the flow restriction 30 and gas outlet 8.

The measure of the gas pressure in the gas cylinder, by means of the high-pressure sensor 32, optionally provided or associated with a temperature sensor, allows to determine the quantify, for instance the mass, of gas contained gas cylinder. As gas is drawn from the gas cylinder, the gas pressure in the gas cylinder progressively diminishes. Also, the effect of the temperature on the pressure of a given mass of gas can be taken into account by the measure of temperature, by application of the perfect gas law and different real gas models of equation of state, like the Van der Waals equation.

The above determination of the gas flow based on the pressure measures upstream of the flow restriction 30 allows to determine, knowing the mass of gas contained in the gas cylinder, the remaining usage time. This determination is achieved without requiring a physical detection of the position of the flow selector, as in the prior art, and also without requiring the use of a flowmeter or flow sensor, usually based on an accurate measure of a differential pressure between a flow restriction, where such sensors are usually not compatible with pressures of up to 8-10 bar occurring when the gas outlet or the device connected thereto is closed.

The above-described determination of the gas flow based on the pressure measure upstream of the flow restriction 30 is rendered possible because the devices or appliances connected to the gas outlet 8 offer a limited flow resistance. Also, an appropriate selection of the cross-section S of the gas passage of the flow restriction 30, in relation the output normal pressure of the pressure reducer 14 and the range of gas flow of the flow selector, allows the optimize the sensibility of the pressure sensor 28 and thereby reduce its requirements and costs.

Still with reference to FIG. 1 we can observe that the gas passage 10 comprises a branch 10.2 directly connected to the regulating chamber 14.6 and extending along a side wall of the cavity housing the pressure reducer 14. A pressure switch 34 is located in operative connection with that branch 10.2 of the gas passage 10, and is electrically connected to the control unit 25. The latter is configured to switch from a sleep-mode to a wake-up or operative mode when the pressure switch is in the presence of a rising gas pressure reaching a predetermined threshold, which can be comprised between 0.5 and 5 bar, for example between 0.5 and 3 bar. The threshold pressure can be comprised between 0.5 bar and 80% of the dynamic pressure of the pressure regulator. This arrangement is advantageous in that it allows to automatically bring the control unit in operative mode upon rotation of the hand-wheel that opens the shut-off valve 12. The reverse can also apply, i.e. the control unit 25 can be configured to switch from an active or operative mode to a sleep-mode once the switch pressure is subjected to a gas pressure that falls below the above predetermined threshold, i.e. when the hand-wheel is rotated backward so as to close the shut-off valve 12. For this situation to occur in a reliable manner, it is advantageous that the flow selector is configured to provide a gas passage in the position of the hand-wheel and relative spindle that closes the shut-off valve 12, so that any residual pressure in the regulating chamber 14.6 can be vented to the gas outlet 8 and allow the gas pressure in contact with the pressure switch 34 to reach of fall below the above predetermined threshold.

The above functionally of the pressure switch is particularly advantageous for preserving the battery life of the control unit, in particular considering that a minimum operational life of 5 years without battery replacement is usually required in the field of gas regulators.

FIG. 2 is sectional view of a portion of the gas regulator 2 of FIG. 1, the section plane however not passing by the longitudinal axis and being inclined relative to the section plane of the section view of FIG. 1.

The branch 10.2 of the gas passage 10 fluidly connecting to the regulating chamber 14.6 (FIG. 1) is visible. It extends longitudinally along the side wall of the cavity housing the pressure reducer (not represented in FIG. 2) and also transversally below the cavity until the auxiliary connector 36 being for instance a medical connector. The latter is as such known and commonly used in hospitals and medical houses for connecting an active device using oxygen. For such active devices, the selector of flow as provided by the flow selector 18 is not necessary and even more not desired, so that the branch 10.2 of the gas passage fluidly connects directly upstream of the flow selector 18 and downstream of the pressure reducer.

As this is apparent, the auxiliary connector 36 comprises a body 36.1 and a shutter 36.2 urged by a spring on an upstream side of a seat formed in the body 36.1, so that the auxiliary connector 36 is normally closed and requires the corresponding connector of the device to comprise a pin forcing the shutter 36.2 to an open position. For properly detecting connection of a device to the auxiliary connector, a position sensor 38 configured for detecting a position of the shutter 36.2 is provided. In the present example, the position sensor 38 is located outside of the gas and of the body and a detector pin 36.3 is attached to the shutter 36.2 and extends out of the branch 1.2 of the gas passage, with a distal end 36.4 outside of the body and in the vicinity of the position sensor 38. The detector pin 36.3 extends through a passage 4.1.2 with sealing means of the body 4, for instance of the main part 4.1 thereof. The position sensor 38 can be of the inductive Hall-effect type, being however understood that other types and other configurations can be considered. As a matter of example, the position sensor 38 can be integrated in the auxiliary connector 36, depending on the materials used for the body 36.1 and the shutter 36.2 of the auxiliary connector 36, and possibly also of the material of the main part 4.1 of the body of the gas regulator, at least if the sensor is of the inductive type. The sensor could be a contact sensor in which case the materials involved are not or at least less relevant.

The position sensor 38 is advantageously electrically connected to the control unit 25 of the gas regulator 2 (FIG. 1), so that the control unit receives the information that a connector is engaged with the auxiliary connector.

FIG. 3 is a schematic illustration of the upper part of the pressure regulator of FIG. 1, illustrating the functioning principle of the pressure measurement for determining the gas flow position and the gas flow.

The cavity 10.1 formed by the gas passage between the flow selector 18 and the flow restriction 30 is well visible and somehow enlarged for the sake of the clarity. The calibrated holes on the disk 18.1 of the flow selector are well visible. The flow of gas, once it has passed the selected calibrated hole of the flow selector can decelerate and stabilize in the cavity 10.1 before passing through the flow restriction 30 towards the outlet 8.

FIG. 4 is a graphic illustration of the signal of the pressure sensor at a low and a high pressure in the gas cylinder, for each position of the flow selector, thereby illustrating the correlation between the signal of the pressure sensor and the gas flow.

A pressure regulator according the architecture schematically illustrated in FIG. 3 has been tested by outputting gas at the different positions of the flow selector and for different pressures inside the gas cylinder, while the output signal of the pressure sensor has been observed and the effective flow rate at the output of the pressure regulator has been measured.

In the left graphic, the horizontal axis corresponds to the 11 positions of the flow selector, named by their nominal flow rate, i.e. 0.5, 1, 2, 3, 4, 5, 6, 7, 9, 11 and 15 litres per minutes (l/min); the left vertical axis corresponds to an output signal of the pressure sensor 28 (FIGS. 1 and 3), expressed for instance in volts (V) and the right vertical axis corresponds to the measured flow rate expressed in litres per minutes (l/min). Each histogram bar, i.e. each per one of the eleven positions of the flow selector, comprises a three bars, a central one (densely dashed or dark) being the measures flow rate, a left one (dashed) being the measured output signal of the pressure sensor when the pressure in the gas cylinder is 20 bar, and a right one (dashed) being the measured output signal of the pressure sensor when the pressure in the gas cylinder is 200 bar.

The right graphic is a magnification of the left portion of the left graphic, showing the first four positions of the flow selector, i.e. 0.5, 1, 2 and 3.

We can observe that the output signals of the pressure sensor, both at 20 bar and 200 bar in the gas cylinder, are very well correlated with the nominal and effective flow rates. In particular for at least the 8 first positions of the flow selector, i.e. 0.5, 1, 2, 3, 4, 5 and 6 l/min, the output signals at 20 bar and 200 bar in the gas cylinder are very close and sufficiently distinct from each other for allowing discrimination. For the further positions of the flow selector, i.e. 7, 9, 12 and 15 l/min, the output values at 20 bar and 200 bar in the gas cylinder show a larger difference, however the maximum value, for instance at 200 bar in the gas cylinder, of each of these positions is substantially lower the lower value, for instance at 20 bar in the gas cylinder, of the next position, so that these output values still allow a proper discrimination.

It is to be noted that in case the deviation in the output signal of the pressure sensor due to variations of the pressure in the gas cylinder would hinder a proper discrimination between the positions of the flow selector, the pressure in the gas cylinder as measured by the high-pressure sensor 32 (FIG. 1) can be taken into account for a better and accurate determination of the selected flow rate.

It is to be noted that the flow selector does not need to show fixed positions, i.e. can be of the continuous type like a needle flow valve whose actuator or needle comprises an infinity of possible angular positions, thereby providing a continuous flow selection. With reference to the above detailed FIG. 4, it is indeed possible to correlate a curve corresponding to the effective flow rate with a curve corresponding to mean values of the output signals for each position.

Also, when the signal received by the pressure sensor exceeds a predetermined threshold, i.e. higher than the maximum value for the greatest selectable flow, for instance 15 l/min, it can be concluded that the gas outlet is obstructed, in particular that the device or appliance connected thereto is not operative. In medical applications, such device or appliance can be a respiratory mask equipped with a hose. The above pressure sensor signal reaching or exceeding the predetermined threshold can concluded to an obstruction of the mask, very likely due to the hose being kinked, as this can often occur. The control unit can output a corresponding alarm.

FIG. 5 is a representation of a pressure regulator 2 for a gas cylinder, similar to the one in FIG. 1, and a detailed representation of an embodiment of the pressure switch 34 schematically represented in FIG. 1 and discussed in a functional manner in connection with that figure.

According to an embodiment of the invention, the pressure switch 34 comprises a plunger 34.1 that is slidably received in a cavity which is instance formed directly in the body 4, i.e. the main part 4.1 thereof. The plunger 34.1 comprises a gasket 34.1.1 that forms a gas-tight barrier with the branch 10.2 of the gas passage fluidly connecting directly upstream of the flow selector and downstream of the pressure reducer. The plunger is retained, in a movable fashion, on the main part 4.1 of the body by means of a retainer 34.2 fastened to the main part 4.1 of the body. A spring 34.3 is operatively placed between the plunger 34.1 and the retainer 34.2 so as to urger the plunger 34.1 is a retracted position relative to the main part 4.1 of the body and the retainer 34.2. The plunger 34.1 comprises a distal free end carrying a magnet or metallic part 34.1.2 that is configured to cooperate with a switch or sensor 34.4, e.g. of the reed type, optical type, or hall-effect type, respectively. The switch or sensor 34.4 can be carrier by a printed circuit board onto which other electronic components can be provided.

As this is apparent, in the absence of pressure above a threshold that can be comprised between 0.5 and 5 bar, the spring 34.3 maintains the plunger 34.1 in a retracted position where the distal end thereof remains distant from the switch or sensor 34.4. Once the shut-off valve is opened, the gas flow through the pressure reducer to a nominal pressure of at least 3.5 bar, thereby moving the plunger 34.1 to an extended position where the distal end magnetically cooperates with the switch or sensor 34.4 for detecting that the pressure regulator 2 is opened.

What is claimed is:

1. A pressure regulator for a gas cylinder, said pressure regulator comprising:

a gas inlet, a gas outlet and a gas passage fluidly connecting the gas inlet with the gas outlet;

a pressure reducer located in the gas passage, downstream of the gas inlet;

a flow selector located in the gas passage, downstream of the pressure reducer;

a pressure sensor located in the gas passage between the flow selector and the gas outlet; and a flow restriction located in the gas passage and downstream of the pressure sensor.

2. The pressure regulator according to claim 1, wherein the flow selector comprises a cross-section that is selectable between a minimum cross-section and a maximum cross-section, the flow restriction having a cross-section smaller than the maximum cross-section.

3. The pressure regulator according to claim 1, wherein the flow restriction comprises a calibrated hole mounted upstream of the gas outlet.

4. The pressure regulator according to claim 1, wherein the gas passage between the flow selector and the flow restriction forms a volume of at least 1 $mm^3$.

5. The pressure regulator according to claim 1, wherein the flow selector is configured to provide a selectable flow comprised between 0.1 and 25 litres/min.

6. The pressure regulator according to claim 1, wherein the flow selector provides a selectable flow in a step-wise manner only.

7. The pressure regulator according to claim 1 further comprising a control unit to which the pressure sensor is connected and configured to determine a gas flow rate from a signal of the pressure sensor.

8. The pressure regulator according to claim 7, wherein the control unit is configured to determine the gas flow rate from the signal of the pressure sensor in the absence of a signal of detection of a position of the flow regulator.

9. The pressure regulator according to claim 7, wherein the control unit is configured to determine the gas flow rate from the signal of the pressure sensor in the absence of a signal of a direct measurement of the gas flow rate.

10. The pressure regulator according to claim 7 further comprising a pressure switch located in the gas passage between the pressure reducer and the flow selector, and electrically connected to the control unit, the control unit being configured to switch from a sleep-mode to a wake-up mode when the gas in contact with the pressure switch reaches a pressure of at least 0.5 bar.

11. The pressure regulator according to claim 7 further comprising a high-pressure sensor located in the gas passage upstream of the pressure reducer, and electrically connected to the control unit.

12. The pressure regulator according to claim 11, wherein the control unit is configured to determine a remaining usage time of the gas cylinder based on the determined gas flow and a signal of the high-pressure sensor.

13. The pressure regulator according to claim 1 further comprising a branch of the gas passage directly connecting between the pressure reducer and the flow selector and connecting to an auxiliary connector.

14. The pressure regulator according to claim 13, wherein the auxiliary connector comprises a shutter that is normally closed by a spring and the pressure regulator further comprises a position sensor of the shutter.

15. The pressure regulator according to claim 14, wherein the auxiliary connector further comprises a position pin with that is attached to the shutter and extends away from the shutter to the position sensor for interacting with the position sensor.

16. The pressure regulator according to claim 13 further comprising a control unit to which the pressure sensor is connected and configured to determine a gas flow rate from a signal of the pressure sensor, and a pressure switch located in the branch of the gas passage between the pressure reducer and the flow selector, and electrically connected to the control unit.

17. The pressure regulator according to claim 1, wherein the pressure regulator is void of a detector of a position of the flow selector and void of a gas flow sensor.

18. A method of determining a gas flow rate at a gas outlet of a pressure regulator on a gas cylinder, wherein the pressure regulator comprises a pressure reducer and a flow selector downstream of the pressure reducer, said method comprising:

measuring a gas pressure in the gas flow downstream of the flow selector and upstream of a flow restriction; and determining the gas flow rate based on the measured gas pressure in the gas flow downstream of the flow selector and upstream of a flow restriction.

19. The method according to claim 18 further comprising:

measuring a pressure of the gas in the gas cylinder; and determining a remaining usage time based on the measured pressure of the gas in the gas cylinder and the determined gas flow rate.

20. The method according to claim 18 further comprising:

determining that the gas outlet is obstructed when the measured gas pressure in the gas flow downstream of the flow selector and upstream of a flow restriction reaches or exceeds a predetermined level, wherein the predetermined level is higher than a gas pressure in the gas flow downstream of the flow selector and upstream of a flow restriction when the flow selector is set at a maximum cross-section and in the absence of obstruction, and equal to or less than a nominal outlet pressure of the pressure reducer.

* * * * *